Jan. 13, 1970        H. W. KAATZ        3,489,389
ROTARY SHUTOFF VALVE
Filed Nov. 13, 1964
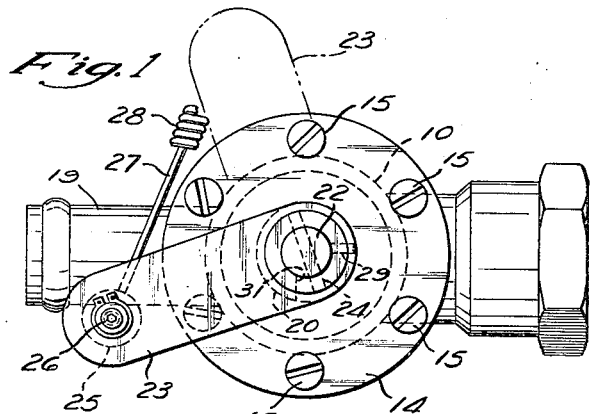
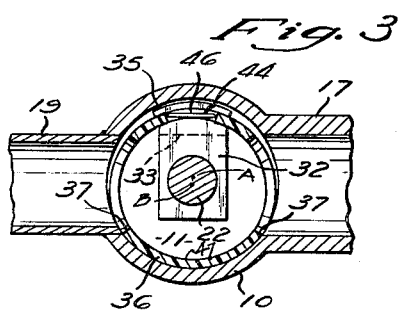
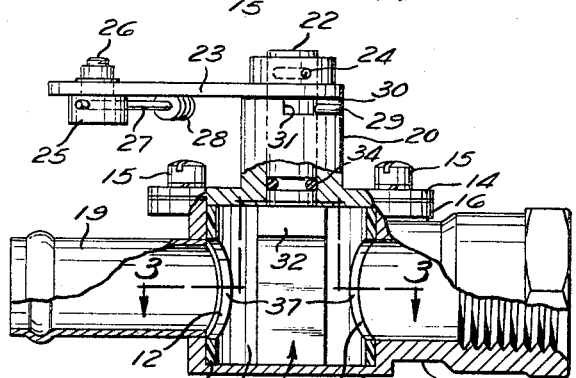
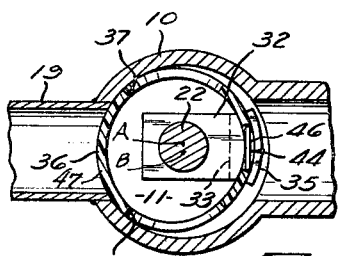
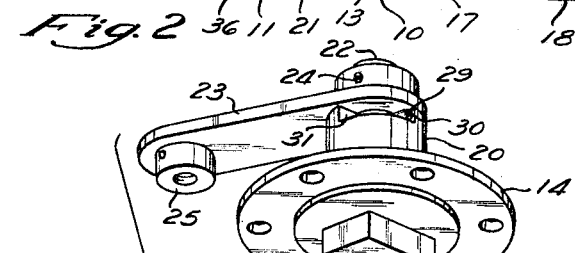
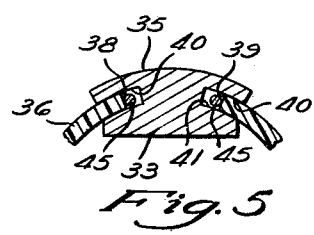
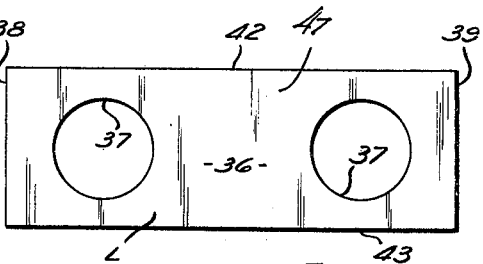
INVENTOR.
HERBERT W. KAATZ
BY Bosworth, Sessions,
Hanstrom & Knowles
ATTORNEYS

United States Patent Office 3,489,389
Patented Jan. 13, 1970

3,489,389
ROTARY SHUTOFF VALVE
Herbert W. Kaatz, Elyria, Ohio, assignor to Airborne Mfg. Co., Elyria, Ohio, a corporation of Ohio
Filed Nov. 13, 1964, Ser. No. 411,018
Int. Cl. F16k 5/04, 5/14, 13/02
U.S. Cl. 251—163
9 Claims This invention relates to a valve of the rotary type which may be used as a shutoff valve or a selector valve or both. A characteristic feature of the invention is the resilient nature of the valve rotor which cooperates with spring loading of the valve closure element to provide variable amounts of resiliently stressed sealing contact and slidable engagement between it and a valve port and the housing of the valve. A further characteristic feature is the variation in torque corresponding to the varying amount of resiliently stressed engagement aforementioned and experienced at the different rotary positions of the valve rotor or closure member.

A general object of this invention is to provide a rotary valve that is able to selectively open and close valve ports by rotation of a valve closure member. A further object is to provide such a valve which tends to be aided in positively sealing and closing a selected outlet port by inlet fluid pressure and yet also positively seals and closes the outlet port without the aid of inlet pressure. Another object is to provide such a valve which does not require or comprise complicated seals and sealing arrangements. Yet another object is to provide such a valve in which the valve closure member is relatively flexible, bendable, slippery, resilient, and easily worked. Another object is to provide such a valve in which the resilient nature of the rotary valve closure permits such a relatively sliding motion between the valve closure member and the valve seats as to effect a useful wiping action between the two for the removal of any material which might interfere with the positive closing of the valve. In addition, it is an object of this invention to provide a valve closure member that has a certain "feel" related to its operational condition. For example, in a shutoff valve, it is desirable to have an increase in torque required at, and perhaps just prior to, the attainment of the fully closed position. It is also an object to provide a valve which is easily and economically manufactured and which employs principles of rotary valve operation not limited to a particular size of valve.

These and other objects and advantages of this invention will become apparent from the following description of a preferred embodiment thereof taken together with the accompanying drawings in which:

FIGURE 1 is a top elevation view of a shutoff valve embodying this invention;

FIGURE 2 is a side elevation view, partially sectioned, of the valve shown in FIGURE 1;

FIGURE 3 is an axially cross-sectional view taken in the plane of line 3—3 of FIGURE 2 and showing the rotary valve member in its open position;

FIGURE 4 is a view similar to that shown in FIGURE 3 but with the valve closure member shown in a closed position;

FIGURE 5 is an enlarged sectional view of a detail of the valve closure member;

FIGURE 6 is an exploded view showing the parts comprising the valve closure member and its operating shaft; and FIGURE 7 is a layout view of the resilient cylindrical portion of the valve closure member shown in the other figures.

The embodiment of this invention described below and illustrated in the drawings is a shutoff valve having an inlet and an outlet and adapted to be inserted in a fluid line for controlling the flow therethrough. The valve is intended to completely stop or to permit full flow in the line, though metering is and can be accomplished by properly positioning the rotary valve member with respect to the ports. The particular valve shown in the drawings is a fuel shutoff valve used in an aircraft fuel system and is shown approximately full size. The principles underlying this invention are equally applicable to valves of much larger or even smaller size than that shown and the results and advantages obtained and enjoyed by practicing this invention are not limited to valves of any particular size.

As best shown in FIGURES 1 and 2, the valve comprises a valve housing, indicated generally at 10, having a generally cylindrical interior chamber 11 into which opens diametrically opposite inlet and outlet ports 13 and 12, respectively. Access to interior chamber 11 may be gained through one end of the cylindrical chamber by removal of cover plate 14 normally held in place by a number of machine screws 15 turned through cover plate 14 and into tapped holes in annular flange 16 surrounding the open end of the valve housing. The other end of chamber 11 is closed.

As shown in the drawings, a short inlet conduit 17, terminating in a female pipe connection 18, is formed in the wall of valve housing 10 at inlet port 13. A short section of outlet conduit 19 is fastened into the wall of valve housing 10 as by brazing at outlet port 12. As shown, outlet conduit 19 is adapted for connection to a rubber hose or the like.

The central portion of cover plate 14 is provided with an upstanding boss 20 having a bore extending through it that is axially parallel and laterally offset from the axis of cylindrical interior chamber 11. The offset between these two axes will be described and explained more fully below.

A rotary valve member, indicated generally at 21, is contained within interior chamber 11 of the valve housing and is operated by rotary operating shaft 22 extending outwardly of the housing through and journalled for rotation in the bore of and through cover plate 14 and cover plate boss 20. Rotary operating shaft 22 may be conveniently moved by crank arm 23 fitted and fastened to one end of the shaft by pin 24 and connected through suitable means such as swivelly-mounted connector 25 carrying a clamping set screw 26 to movable wire 27 of a Bowden wire control 28. In the valve as shown and illustrated in FIGURES 1, 2, and 6, rotary valve member 21 is limited to 90° of rotation in interior chamber 11 by the cooperation of stop pin 29 extending radially outwardly from rotary operating shaft 22 for engagement with circumferentially spaced apart stops 30 and 31 at one end of cover plate boss 20. Other suitable means may be employed for this purpose.

Rotary valve member 21, contained within interior chamber 11 of the valve housing, comprises a crank 32 attached to the inner end of operating shaft 22 and carrying on its radially outer end and in fixed relation to it the rigid driving and supporting element 33. Together, crank 32 and driving and supporting element 33 have a generally L-shaped configuration as can be seen in FIGURE 6. One side face of crank 32 rides closely against the inside of cover plate 14, though the operating shaft is sealed against fluid pressure by means of an O-ring seal 34 carried in an appropriate groove of the shaft for sealing engagement with the walls of the bore carrying the shaft. The radially outwardly facing side of driving and supporting element 33, as viewed with respect to the axis of rotation of operating shaft 22, is spaced from that axis an amount such that it closely approaches the closest point in the cylindrical wall of interior chamber 11 when rotated about its axis offset from the chamber axis. At a position of rotation diametrically opposite from the closest point, therefore, outside face 35 of element 33 is spaced away from the cylindrical side wall of chamber 11 an amount equal to twice the lateral offset of the axes of operating shaft 22 and interior chamber 11.

Element 33 drives and supports a resilient, flexible, ported approximate cylinder 36, preferably formed of slippery, flexible, bendable, and resilient material, such as the plastic resin, polytetrafluoroethylene, sold under Du Pont's trademark, Teflon, and out of strip stock of such material. In the valve shown in the drawings and described herein, strip stock approximately 1¼ inches wide and ⅟₁₆ inch thick is used. FIGURE 7 shows a length L of such strip stock lying flat. As shown, length L is provided with two openings or ports 37 which become the ports in rotary valve member 21 when length L is formed generally into a cylindrical shape as ported cylinder 36 and driven and supported by element 33 in a manner to be described below.

Ported cylinder 36, formed from length L of ported strip material, is neither a true nor a complete cylinder, but is split or has a longitudinal opening in one side formed by the unjoined and spaced apart matching and facing strip ends 38 and 39. Strip ends 38 and 39 are slidably received in circumferential and axially extending grooves 40 and 41, respectively, provided in circumferentially opposite sides of driving and supporting element 33. It will be noted that, when strip ends 38 and 39 are positioned in grooves 40 and 41, respectively, as seen in FIGURES 3 and 4 and particularly in enlarged detail in FIGURE 5, the portions of cylinder 36 adjacent driving and supporting element 33 are spaced radially inwardly from outside face 35 of its driving and supporting element 33 so that, in all positions of rotation of element 33 within interior chamber 11, the portions of ported cylinder 36 circumferentially adjacent each side of driving and supporting element 33 are spaced from the interior wall of interior chamber 11.

Referring now to FIGURES 3 and 4, length L of ported strip material comprising ported cylinder 36 is of such a length that, when formed into a split cylinder with its ends slidably carried in grooves 40 and 41 of element 33, a central wall portion 47 comprising an appreciable angular extent of the side wall of ported cylinder 36 and centered approximately opposite driving and supporting element 33 and the split in the cylinder fits and lies smoothly and resiliently presses and is resiliently stressed outwardly against and along the interior side wall of chamber 11 to a substantial extent by virtue of the resilient nature of ported cylinder 36. The angular extent of the wall portion 47 of ported cylinder 36 which always lies flat and presses outwardly against the inside wall of chamber 11 is more than enough to cover ports 12 and 13 entering chamber 11 and at least a little of the interior wall of chamber 11 forming a margin around the ports. It will be noted that length L of resilient material comprising ported cylinder 36 has complete and continuous upper and lower longitudinal marginal portions 42 and 43, respectively. Also, the material between spaced apart ports 37 in ported cylinder 36 is more than large enough to completely cover either port in the valve as well as the margins of the chamber surrounding it.

When ported cylinder 36, mounted and supported by element 33, is in place within interior chamber 11, the strip ends 38 and 39 are pushed toward, but fail to reach, the bottom of grooves 40 and 41, respectively, in all positions of rotation of the cylinder. I prefer to install between the groove bottoms and strip ends 38 and 39 a wire hairpin spring 44 shown in perspective in FIGURE 6 and having side legs 45 shown in cross section in FIGURE 5. It will be seen in FIGURE 6 that side legs 45 are preformed in a bow, curving away from each other. This bowlegged hairpin spring 45 is mounted on supporting element 33 by inserting legs 45 in grooves 40 and 41 as shown. The cross-connecting portion 46 of spring 44 extends circumferentially between grooves 40 and 41 as shown in FIGURES 3 and 4. Spring 44 functions to provide a predetermined fixed amount of preloading applied to strip ends 38 and 39 of ported cylinder 36, tending to resiliently urge and press and to cause the strip material comprising ported cylinder (especially that portion opposite element 33) to lie flat against the wall of interior chamber 11. Hairpin spring 44 preferably has a high spring rate so that small displacements, i.e. changes in the curvature of bowed legs 45 by small endwise movement of stress ends 38 and 39 into and out of grooves 40 and 41, respectively, cause sharp changes in the force applied by the spring.

The operation of the valve described above can best be explained in connection with FIGURES 3 and 4 of the drawings. FIGURE 3 shows the valve in an open position and FIGURE 4 in a closed position. As shown in FIGURES 3 and 4, 90° of clockwise rotation of rotary valve member 21 and its operating shaft 22 moves ported cylinder 36 from the position shown in FIGURE 3 with its ports 37 aligned with ports 12 and 13 in the wall of interior chamber 11 to the position shown in FIGURE 4 with ports 37 of ported cylinder 36 out of alignment with chamber ports 12 and 13 and the imperforate central wall portion 47 of ported cylinder 36 overlying and sealing closing port 12 in the interior chamber wall. As shown in FIGURES 3 and 4, the valve is intended to permit and prevent flow from right to left through the valve. Of course, if valve member 21 were rotated 90° in a counterclockwise direction from its position shown in FIGURE 3, the valve would be adapted to permit and prevent flow through the valve housing from left to right. Because of this option concerning the direction of rotation of the rotary valve member in the valve as shown in FIGURES 3 and 4, the terms "inlet" and "outlet" may be used interchangeably, as appropriate, in connection with ports 12 and 13 in the wall of interior chamber 11.

It will be seen that the solid and imperforate portion of ported cylinder 36, located between ports 37 therein, constitutes a resilient, bendable, thin portion of wall large enough to completely cover and close off any one of the ports in the interior chamber of the valve housing. This central wall section 47 is resiliently urged radially outwardly by the curvature formed into length L of the material forming ported and split cylinder 36. Hairpin spring 44 also acts to resiliently urge central wall section 47 of ported cylinder 36 radially outwardly against and into slidable engagement with the cylindrical wall of interior chamber 11.

Another feature of my invention embodied in the valve described above and shown in the drawings is obtained by virture of the offset relationship of the axis of rotation A of rotary valve member 21 and axis B of cylindrical interior chamber 11. These two axes are identified in FIGURES 3 and 4 where they appear as points. It will be noted that axis of rotation A is laterally offset from axis B in a direction normal to the diameter extending between the centers of ports 12 and 13 of the chamber. Axis B is aligned on such a diameter. The result of the offset relationship of axes A and B is that driving and supporting element 33 of rotary valve member 21 is either closer or farther from the cylindrical wall of chamber 11, depending upon its relative rotational position therein. As seen in FIGURE 3, element 33 is as close as possible to the chamber wall because it is radially in line with the lateral offset of the two axes A and B and is positioned toward the wall by the full amount of the offset. In the position shown in FIGURE 4, element 33 is half of its possible excursion away from the cylindrical wall of chamber 11; and, if it were rotated 90° more in a clockwise direction, it would be spaced from the wall of chamber 11 the greatest possible amount, i.e. an amount equal to twice the amount of lateral offset of axes A and B.

The consequence of the radial excursions of supporting element 33 described above is that that portion of ported cylinder 36 diametrically opposite element 33, i.e. central wall section 47, is urged more or less tightly against the wall of the interior chamber 11. For example, as shown in FIGURE 3, central wall section 47 is resiliently stressed into slidable engagement with and against the cylindrical wall of the interior chamber a lesser amount than it is when in the position shown in FIGURE 4. Thus, by virtue of the lateral offset of axis A of rotation of the rotary valve member from axis B of cylindrical interior chamber 11, the port closing and sealing element, i.e. central wall section 47, can be urged more strongly against the cylindrical wall when the valve is closed and with less force when the valve is open. This feature provides for good sealing at very low pressures, i.e. as low as one-tenth of a pound per square inch of the valve shown in the drawings and described above. Also, this variation in the amount of resilient stress produced in the valve closure member 21 gives the valve a desirable "feel," i.e. increase in torque at and approaching the closed valve position and decrease in torque away from that position. This variation of the resilient stress provided by the lateral offset of the axes A and B is enhanced and augmented by the high spring rate resilience of hairpin spring 44.

It will be apparent that valves embodying my invention and having more than two ports are possible. Ported cylinders having more than two ports may be provided and the lateral offset of the axes so arranged with respect to the ports in the valve member and the valve housing that the torque variations and resilient stress variations in the valve member are arranged as desired.

Likewise, it will be apparent that a resilient, bendable, thin wall section corresponding in size and function to central wall section 47 of ported cylinder 36 only may be resiliently mounted on the outside face 35 of driving and supporting element 33 in place of ported and split cylinder 36. As element 33 is rotated and moves toward and away from the cylindrical wall of chamber 11, the resilient mounting of such a wall section tends to be stressed so as to urge it more or less tightly into engagement with and against the chamber wall. If the resilient mounting has a high spring rate, the offset axis or eccentric offset is enhanced and augmented as in the preferred form shown. An outstanding advantage of this modified form is that the bendable material used to overlie and close a port may be backed by a stronger metal plate, for example, which increases the closure's resistance to "blow through" when covering a port with high pressure applied on its radially inner face.

A further advantage enjoyed in valves embodying my invention is gained by the "split" in ported cylinder 36 comprising the valve closure member. When strip stock of any appreciable thickness is rolled and fastened together into a cylinder, the sides of the cylinder so formed tend not to be straight and the ends of the cylinder are bell-mouthed due to the compression and tension set up in the material at and in varying amounts adjacent to the inner and outer surfaces. Such a cylinder cannot be made to seal a port in a straight cylindrical wall very well. Splitting the cylinder, however, relieves and/or interrupts those sides curved, and permits a good fit and seal to be obtained.

Those skilled in the art will appreciate that various changes and other modifications can be made in the apparatus described herein without departing from the spirit and scope of the invention.

I claim:

1. A rotary valve comprising a valve housing including a cylindrically walled interior chamber and an inlet and an outlet port in said cylindrical chamber wall, a rotary valve member in said chamber and rotatable about an axis therein, said valve member comprising a longitudinally split, ported, approximate cylinder corresponding to and fitting into said cylindrical interior chamber and having ports alignable with said inlet and outlet ports in one position of rotation and out of alignment in other positions of rotation, means resiliently biasing said ported split cylinder into resiliently stressed slidable engagement with said chamber wall, rotating means for rotating said ported and resiliently biased cylinder, said rotating means being operatively connected to and supporting said ported approximate cylinder only adjacent said longitudinal split therein and at a fixed radius from said axis of rotation of said rotary valve member whereby said ported cylinder is strongly urged and resiliently stressed into tight slidable engagement with said chamber wall when in a position of rotation with respect to one of said ports that closes, covers, and seals it.

2. A rotary valve comprising a valve housing including a cylindrically walled interior chamber having an axis and an inlet and an outlet port in said cylindrical chamber wall, a rotary valve member in said chamber and rotatable therein and about an axis laterally offset in a direction out of alignment with said ports from said chamber axis, said valve member comprising a longitudinally split, ported, approximate cylinder corresponding to and fitting into said cylindrical interior chamber and having ports alignable with said inlet and outlet ports in one position of rotation and out of alignment in other positions of rotation, means resiliently biasing said ported split cylinder into resiliently stressed slidable engagement with said chamber wall, rotating means for rotating said ported and resiliently biased cylinder about said offset axis of said valve member and eccentrically of said chamber axis, said rotating means being operatively connected to and supporting said ported approximate cylinder only adjacent said longitudinal split therein and at a fixed radius from said offset axis of said valve member whereby said ported cylinder is laterally translated toward and most strongly urged and resiliently stressed into tight slidable engagement with said chamber wall when in a position of rotation with respect to one of said ports that closes, covers, and seals it.

3. The rotary valve of claim 2 in which said ported and split cylinder has a bendable curved wall resiliently stressed when slidably engaging said chamber wall and comprises said resilient biasing means.

4. The rotary valve of claim 3 together with spring means resiliently biasing and tending to increase the circumference of said ported and split cylinder into resiliently stressed slidable engagement with said chamber wall.

5. A rotary valve comprising a valve housing including a cylindrically walled interior chamber having an axis and an inlet and an outlet port disposed approximately opposite each other in said cylindrical chamber wall, a rotary valve member in said chamber and rotatable therein and about an axis laterally offset in a direction normal to the line of alignment of said ports from said chamber axis, said valve member comprising a longitudinally split, ported, resilient, bendable, approximate cylinder corresponding to and fitting into said cylindrical interior chamber and having ports alignable with said inlet and outlet ports in one position of rotation and out of alignment and covering one of said ports in other positions of rotation, spring means resiliently biasing and tending to increase the circumference of said ported split cylinder into resiliently stressed slidable engagement with said chamber wall, rotating means for rotating said ported and resiliently biased cylinder about said offset axis of said valve member and eccentrically of said chamber, said rotating means being operatively connected to and supporting said ported approximate cylinder only adjacent said longitudinal split therein and at a fixed radius from said offset axis of said valve member whereby said ported cylinder is laterally translated toward and most strongly urged and resiliently stressed into tight slidable engagement with said chamber wall when in a position of rotation with respect to one of said ports that closes, covers, and seals it.

6. The valve of claim 5 in which said split ported cylinder is formed of a flat strip of resilient bendable strip stock having punch-formed ports therein.

7. The valve of claim 6 in which said means for rotating said ported split cylinder comprises a rotating shaft entering said chamber and rotating about said offset axis, a crank rigidly connected to the inner end of said shaft, and a driving and supporting element rigidly connected to and extending longitudinally from said crank in a direction parallel to said axis, said element having circumferentially oppositely disposed and facing grooves extending longitudinally parallel to said axis of rotation, each of said grooves slidably receiving and telescopically holding one end of said strip stock comprising said ported split cylinder, whereby all of the aforesaid means for holding and rotating said ported split cylinder and its offset axis of rotation cooperate to resiliently stress said cylinder into tighter slidable engagement with said chamber wall when one of said ports therein is closed, covered, and sealed by said cylinder than when said one of said ports is in alignment with one of said ports in said cylinder.

8. The valve of claim 7 in which said spring means comprises curved wire springs confined between the ends of said strip stock comprising said split cylinder and the bottoms of said grooves telescopingly receiving them.

9. A rotary valve comprising a valve housing including a cylindrically walled interior chamber having an axis and at least two ports in the cylindrical walls of said chamber, a rotary valve member in said chamber and rotatable therein and about an axis laterally offset from said chamber axis for selectively opening and closing said ports, said valve member comprising a resilient, bendable, thin wall section generally comprising a portion of the surface of a cylinder and large enough in area to cover and close at least one of said ports at a time and at least a margin of said cylindrical chamber wall completely surrounding it when curved to conform to and lie against said cylindrical chamber wall, said wall section being movable around and inside said interior chamber to positions covering and opening selected ones of said ports and being at all positions of rotation within said chamber resiliently urged to bend, curve, conform, and lie against said cylindrical chamber wall in resiliently biased slidable engagement therewith, said resilient urging of said movable wall being greater and said slidable engagement between said movable wall and said cylindrical wall being tighter when said movable wall is positioned to close the valve than when it is positioned to open the valve.

References Cited

UNITED STATES PATENTS

| 1,048,635 | 12/1912 | Allerding | 251—183 X |
| 1,731,224 | 10/1929 | Kiley | 251—182 X |
| 2,075,459 | 3/1937 | Parker | 251—182 |
| 2,574,428 | 11/1951 | Wheatley | 251—163 X |
| 2,649,275 | 8/1953 | Noyes | 251—175 X |
| 3,180,362 | 4/1965 | Muller | 251—163 X |
| 3,254,872 | 6/1966 | Roos | 251—163 |
| 3,269,415 | 8/1966 | Wapner | 251—175 X |
| 3,047,019 | 7/1962 | Simpson | 251—175 XR |

FOREIGN PATENTS

| 284,372 | 5/1915 | Germany. |
| 1,054,799 | 4/1959 | Germany. |

HAROLD W. WEAKLEY, Primary Examiner

U.S. Cl. X.R.

251—175, 183, 317